(12) United States Patent
Ito et al.

(10) Patent No.: US 6,316,873 B1
(45) Date of Patent: *Nov. 13, 2001

(54) ELECTRON EMISSION DEVICE AND DISPLAY DEVICE USING THE SAME

(75) Inventors: Hiroshi Ito; Kiyohide Ogasawara; Takamasa Yoshikawa; Takashi Chuman; Nobuyasu Negishi; Shingo Iwasaki; Atsushi Yoshizawa; Takashi Yamada; Shuuichi Yanagisawa; Kazuto Sakemura, all of Tsurugashima (JP)

(73) Assignee: Pioneer Electronic Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/131,339

(22) Filed: Aug. 7, 1998

(30) Foreign Application Priority Data

Aug. 8, 1997 (JP) .................................... 9-215134

(51) Int. Cl.$^7$ ..................................... H01J 1/62
(52) U.S. Cl. ...................... 313/496; 313/310; 313/495; 313/309
(58) Field of Search ...................................... 313/310, 309, 313/336, 351, 495, 496, 422, 512; 257/10, 9, 11, 30, 37, 39; 428/901, 131, 426, 446, 569

(56) References Cited

U.S. PATENT DOCUMENTS 5,894,189 * 4/1999 Ogasawara et al. .................. 313/310
5,982,091 * 11/1999 Konishi ................................ 313/495

FOREIGN PATENT DOCUMENTS 7-65710   3/1995 (JP) .................................. H01J/9/02

* cited by examiner

Primary Examiner—Michael H. Day
Assistant Examiner—Joseph Williams
(74) Attorney, Agent, or Firm—Morgan, Lewis & Bockius LLP (57) ABSTRACT

An electron emission device exhibits a high electron emission efficiency. The device includes an electron-supply layer of metal or semiconductor, an insulator layer formed on the electron-supply layer, and a thin-film metal electrode formed on the insulator layer. The insulator layer has a film thickness of 50 nm or greater. The electron-supply layer has a silicide layer. When an electric field is applied between the electron-supply layer and the thin-film metal electrode, the electron emission device emits electrons.

20 Claims, 9 Drawing Sheets

ELECTRON EMISSION DEVICE AND DISPLAY DEVICE USING THE SAME

BACKGROUND OF THE INVENTION

1. Field of the Invention

The present invention relates to an electron emission device and an electron emission display device using the same.

2. Description of the Related Art

In field electron emission display apparatuses, a Field Emission Display (FED) is known as a planar emission display device equipped with an array of cold-cathode electron emission source which does not require cathode heating. The emission principle of, for example, an FED using Spindt-type cold cathodes of minute protrusions is as follows: Its emission principle is like a Cathode Ray Tube (CRT), although this FED has a cathode array of Spindt-type protrusions which is different from that of CRT. In the FED, electrons are drawn into a vacuum space by means of each gate electrode spaced apart from the Spindt-type cathode. and the electrons are made to impinge upon the fluorescent substance that is coated on a transparent anode, thereby causing light emission.

This FED, however, has a problem of low production yield because the manufacture of the minute Spindt-type emitter arrays as a cold cathode is complex and involves many processes.

There also exists an electron emission device with a metal-insulator-metal (MIM) structure as a planar electron emission source. The electron emission device with the MIM structure comprises an Al underlayer as a base electrode, an $Al_2O_3$, insulator layer with about 10 nm thickness, and an Au overlayer, as a top electrode with about 10 nm thickness which are formed in order on the substrate. In the case that this MIM device is placed under an opposing electrode in a vacuum, when a voltage is applied between the Al underlayer and the Au overlayer and, at the same time, an acceleration voltage is applied to the opposing electrode, then some of electrons emit out of the Au overlayer and reach the opposing electrode. Even the electron emission device with the MIM structure does not yet provide a sufficient amount of emitted electrons.

To improve these disadvantages of emission of the MIM device, it is conventionally considered that there is a necessity to make the $Al_2O_3$, insulator layer thinner by about several nanometers and make the $Al_2O_3$ insulator layer with a uniform quality so that the interface between the $Al_2O_3$, insulator layer and the Au overlayer is more uniform.

To provide a thinner and more uniform insulator layer, for example, an attempt has been made to control the anodized current by using an anodization method thereby to improve the electron emission characteristics, as in the invention described in Japanese Patent Application kokai No. Hei 7-65710.

However, even an electron emission device with the MIM structure which is manufactured by this anodization method ensures an emission current of about $1 \times 10^{-5}$ A/cm$^2$ and an electron emission efficiency of about $1 \times 10^{-3}$.

OBJECTS AND SUMMARY OF THE INVENTION

Accordingly, it is an object of the present invention to provide an electron emission device with a high electron emission efficiency capable of stably emitting electrons with a low applied voltage thereto and an electron emission display apparatus using the same.

In consideration to a universal application of this electron emission device, the usage of silicon (Si) for an electron-supply layer in the electron emission device is effective to improve the stability of electron emission in the device and also the use of an amorphous silicon (a-Si) layer deposited by a sputtering method is effective in a high productivity and therefore is very useful. Since the heat treatment is necessary for vacuum-packaging of the device, the device suffers from the inevitable radiant heat occurred during vacuum sealing. However there is a problem that the property of the a-Si layer is apt to deteriorate due to a heat treatment thereto, because an alloy layer are generated at the interface between e.g., an Al ohmic electrode and a Si electron-supply layer by the diffusion thereof. The alloy layer may alter the internal stress and electric resistance value of the electron emission device display, so that durability of the device becomes poor because its electric properties such as electron emission efficiency and negative resistance are changed as well as its mechanical properties. Accordingly, it is another object of the present invention to provide an electron emission device with a high stability at a high temperature and an electron emission display apparatus using the same.

In order to overcome the foregoing and other problems, the object of the invention are realized by an electron emission device in accordance with embodiments of this invention, wherein the device according to the invention comprises:

an electron-supply layer made of metal or semiconductor disposed on an ohmic electrode;

an insulator layer formed on the electron-supply layer; and a thin-film metal electrode formed on the insulator layer and facing a vacuum space, characterized in that said insulator layer has a film thickness of 50 nm or greater, and said electron-supply layer has a silicide layer, whereby the electron emission device emits electrons when an electric field is applied between the electron-supply layer and the thin-film metal.

In the electron emission device according to the invention, said electron-supply layer is disposed on an ohmic electrode and said silicide layer is disposed at an interface between the ohmic electrode and said electron-supply layer.

In the electron emission device according to the invention, said silicide layer is disposed at an interface between the insulator layer and said electron-supply layer.

In the electron emission device according to the invention, said silicide layer is disposed at an mediate region of said electron-supply layer.

In the electron emission device according to the invention, a plurality of said silicide layer and said electron-supply layer are alternately layered by in the thickness direction.

In the electron emission device according to the invention, a plurality of said layered silicide layers have thicknesses gradually descended in the thickness direction.

In the electron emission device according to the invention, a plurality of said layered soicide layers have thicknesses gradually ascended in the thickness direction.

Moreover a display device using an electron emission device according to the invention comprises:

a pair of first and second substrates facing each other with a vacuum space in between;

a plurality of electron emission devices provided on the first substrate;

a collector electrode provided in the second substrate; and a fluorescent layer formed on the collector electrode, each of the electron emission devices comprising an electron-supply layer of metal or semiconductor; an insulator layer formed on the electron-supply layer; and a thin-film metal electrode formed on the insulator layer and facing a vacuum space, wherein said insulator layer has a film thickness of 50 nm or greater, and said electron-supply layer has a silicide layer.

In the electron emission display device according to the invention, said electron-supply layer is disposed on an ohmic electrode and said silicide layer is disposed at an interface and/or between the ohmic electrode and said electron-supply layer.

In the electron emission display device according to the invention, said silicide layer is disposed at an interface and/or between the insulator layer and said electron-supply layer.

In the electron emission display device according to the invention, said silicide layer is disposed at an mediate region of said electron-supply layer.

In the electron emission display device according to the invention, a plurality of said silicide layer and said electron-supply layer are alternately layered by in the thickness direction.

In the electron emission display device according to the invention. a plurality of said layered silicide layers have thicknesses gradually descended in the thickness direction.

In the electron emission display device according to the invention, a plurality of said layered silicide layers have thicknesses gradually ascended in the thickness direction.

According to the electron emission device of the invention with the above structure, the thermal stability of the device is improved since the silicide layer has a thermal stability in the device. In applications of a display device based on the electron emission device, there is obtained a stable high luminance electron emission display durable against the vacuum-packaging. Moreover, through-bores are not likely to be produced in the insulator layer because of its relatively thick thickness and therefore its production yield is improved.

The electron emission device of the invention is a planar or spot-like electron emission diode and can be adapted to high speed devices such as a source of a pixel vacuum tube or bulb, an electron emission source of a scanning or transmission electron microscope, a vacuum-micro electronics device and the like. In addition, this electron emission device can serve as a minute microwave tube or a diode which emits electromagnetic waves with millimeter or submillimeter wavelength, and also can serve as a high speed switching device.

DETAILED DESCRIPTION OF THE PREFERRED EMBODIMENTS

Preferred embodiments according to the present invention will be described in more detail with reference to the accompanying drawings.

Figure 1:
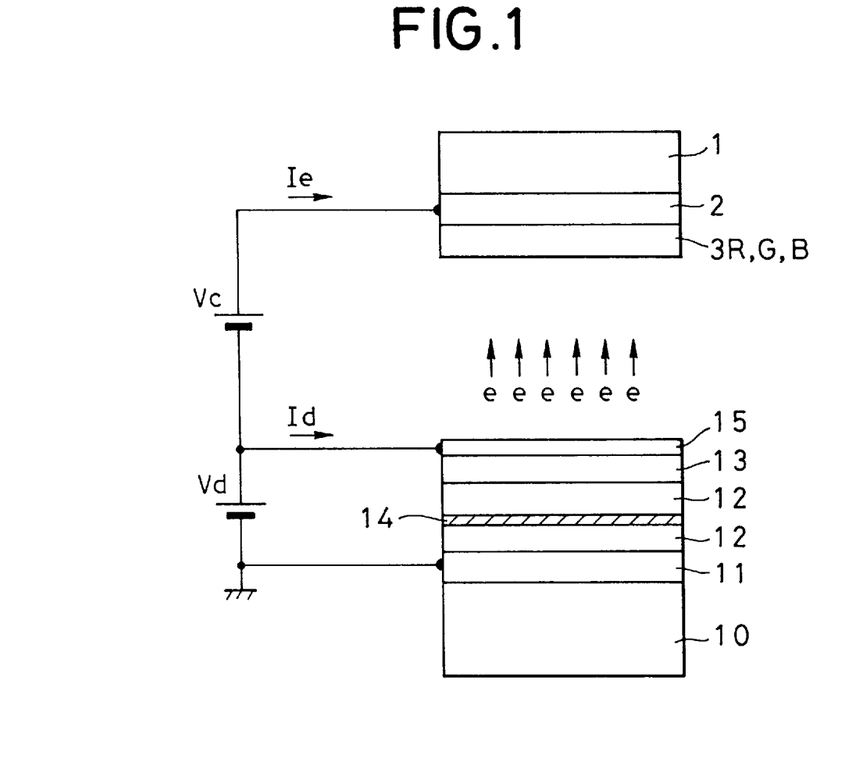
FIG. 1 is a schematic cross-sectional view of an electron emission device according to the invention.

As shown in FIG. 1, an electron emission device embodying the invention has an electron-supply layer 12 of silicon (Si), an insulator layer 13 of silicon dioxide ($SiO_2$) and a thin-film metal electrode 15 of gold (Au) facing a vacuum space which are layered or deposited in turn on an electrode surface of a device substrate 10 of glass on which an ohmic electrode 11 of tungsten (W) is previously formed. Particularly, in the electron-supply layer 12, a silicide layer 14 is disposed at an mediate region thereof, which is a thermally stable intermetallic compound. The insulator layer 13 is deposited in relatively thicker thicknesses so as to have a thickness of 50 nm or greater. A second substrate 1 is fixed to the first substrate 10 so as to sandwich a vacuum space therebetween. Ceramics such as $Al_2O_3$, $Si_3N_4$ and BN etc. may be used for the material of the device substrate 10 instead of glass.

This electron emission device can be regarded as a diode of which the thin-film metal electrode 15 at its surface is connected to a positive applied voltage Vd and the back i.e., ohmic electrode 11 is connected to a ground potential. When the voltage Vd e.g, 90V is applied between the ohmic electrode 11 and the thin-film metal electrode 15 to supply electrons into the electron-supply layer 12, a diode current Id flows. Since the insulator layer 13 has a high resistance, most of the applied electric field is applied to the insulator layer 13. The electrons travel in the conduction band in the insulator layer 13 toward the thin-film metal electrode 15. Some of the electrons that reach near the thin-film metal electrode 15 tunnel through the thin-film metal electrode 15, due to the strong electric field, to be emitted out into the vacuum space.

The electrons e (emission current Ie) discharged from the thin-film metal electrode 15 by the tunnel effect are soon accelerated by a high voltage Vc, which is applied to an opposing collector electrode (transparent electrode) 2, and is collected at the collector electrode 2. If a fluorescent substance is coated on the collector electrode 2, corresponding visible light is observed.

The silicide layer 14 is deposited as a thin film and made by alloying of a semiconductor Si with a transition metal such as W, Mo, Ti, Cr, V, Co, Fe, Ta, Nb, Hf, Zr, Mn, Re, Ru, Os, Rh, Ir, Ni, Pd, and Pt and disposed at an mediate region of the electron-supply layer 12. Instead of the mediate, the silicide layer 14 may be formed at least one of interfaces both between the insulator layer 13 and the electron-supply layer 12 and between the ohmic electrode 11 and the electron-supply layer 12. The silicide layer 14 may be formed with an artificial layered structure, e.g., W/Si layer. In addition to a single layer structure of silicide, plural silicide layers 14 may be formed as a superlattice consisting of metal and Si atoms or a multilayer structure. Moreover the film thickness of these structures of the single layer, superlattice and multilayer is ranging from several nanometers to tens nano-meters.

Silicon oxide $SiO_x$ (wherein subscribed x represents an atomic ratio) is effective as the dielectric material of the insulator layer 13 and, metal oxides or metal nitrides such as $LiO_x$, $LiN_x$, $NaO_x$, $KO_x$, $RbO_x$, $CsO_x$, $BeO_x$, $MgO_x$, $MgN_x$, $CaO_x$, $CaN_x$, $SrO_x$, $BaO_x$, $ScO_x$, $YO_x$, $YN_x$, $LaO_x$, $LaN_x$, $CeO_x$, $PrO_x$, $NdO_x$, $SmO_x$, $EuO_x$, $GdO_x$, $TbO_x$, $DyO_x$, $HoO_x$, $ErO_x$, $TmO_x$, $YbO_x$, $LuO_x$, $TiO_x$, $TiN_x$, $ZrO_x$, $ZrN_x$, $HfO_x$, $HfN_x$, $ThO_x$, $VO_x$, $VN_x$, $NbO_x$, $TaO_x$, $TaN_x$, $CrO_x$, $CrN_x$, $MoO_x$, $MoN_x$, $WO_x$, $WN_x$, $MnO_x$, $ReO_x$, $FeO_x$, $FeN_x$, $RuO_x$, $OsO_x$, $CoO_x$, $RhO_x$, $IrO_x$, $NiO_x$, $PdO_x$, $PtO_x$, $CuO_x$, $CuN_x$, $AgO_x$, $AuO_x$, $ZnO_x$, $CdO_x$, $HgO_x$, $BO_x$, $BN_x$, $AlO_x$, $AlN_x$, $GaO_x$, $GaN_x$, $InO_x$, $SiN_x$, $GeO_x$, $SnO_x$, $PbO_x$, $PO_x$, $PN_x$, $AsO_x$, $SbO_x$, $SeO_x$, $TeO_x$ and the like can be used as well. Furthermore, metal complex oxides such as $LiAlO_2$, $Li_2SiO_3$, $Li_2TiO_3$, $Na_2Al_{22}O_{34}$, $NaFeO_2$, $Na_4SiO_4$, $K_2SiO_3$, $K_2TiO_3$, $K_2WO_4$, $Rb_2CrO_4$, $Cs_2CrO_4$, $MgAl_2O_4$, $MgFe_2O_4$, $MgTiO_3$, $CaTiO_3$, $CaWO_4$, $CaZrO_3$, $SrFe_{12}O_{19}$, $SrTiO_2$, $SrZrO_3$, $BaAl_2O_4$, $BaFe_{12}O_{19}$, $BaTiO_3$, $Y_3Al_5O_{12}$, $Y_3Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GdFeO_3$, $Gd_3Fe_5O_{12}$, $DyFeO_3$, $Dy_3Fe_5O_2$, $HoFeO_3$, $Ho_3Fe_5O_{12}$, $ErFeO_3$, $Er_3Fe_5O_{12}$, $Tm_3Fe_5O_{12}$, $LuFeO_3$, $Lu_3Fe_5O_{12}$, $NiTiO_3$, $Al_2TiO_3$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2O_4$, $Ag_2CrO_4$, $BaCrO_4$, $K_2MoO_4$, $Na_2MoO_4$, $NiMoO_4$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CoTiO_3$, $CoWO_4$, $NiFe_2O_4$, $NiWO_4$, $CuFe_2O_4$, $CuMoO_4$, $CuTiO_3$, $CuWo_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_{12}$, $InFeO_3$, $MgIn_2O_4$, $Al_2TiO_5$, $FeTiO_3$, $MgTiO_3$, $NaSiO_3$, $CaSiO_3$, $ZrSiO_4$, $K_2GeO_3$, $Li_2GeO_3$, $Na_2GeO_1$, $Bi_2Sn_3O_9$, $MgSnO_3$, $SrSnO_3$, $PbSiO_3$, $PbMoO_4$, $PbTiO_3$, $SnO_2$—$Sb_2O_3$, $CuSeO_4$, $Na_2SeO_3$, $ZnSeO_3$, $K_2TeO_3$, $K_2TeO_4$, $Na_2TeO_3$, $Na_2TeO_4$ and the like can be used as well and still furthermore, sulfides such as FeS, $Al_2S_3$, MgS, ZnS and the like, fluorides such as LiF, $MgF_2$, $SmF_3$ and the like, chlorides such as HgCl, $FeCl_2$, $CrCl_3$ and the like, bromides such as AgBr, CuBr, $MnBr_2$ and the like, iodide such as $PbI_2$, CuI, $FeI_2$ and the like and metal oxidized nitrides such as SiAlON and the like can be used as well for the insulator layer.

Moreover, carbon such as diamond, Fullerene ($C_{2n}$) and the like or metal carbide such as $Al_4C_3$, $B_4C$, $CaC_2$, $Cr_3C_2$, $Mo_2C$, MoC, NbC, SiC, TaC, TiC, VC, $W_2C$, WC, ZrC and the like are also effective as the dielectric material of the insulator layer 13. Fullerene ($C_{2n}$) consists of carbon atoms. The representative $C_{60}$ is a spherical surface basket molecule as known a soccer ball molecule. There is also known $C_{32}$ to $C_{960}$ and the like. The subscribed x in $O_x$, $N_x$ and the like in the above chemical formulas represent atomic ratios and also herein after.

The film thickness of the insulator layer 13 may be 50 nm or greater preferably in ranging from 100 to 1000 nm.

While Si is particularly effective as a material for the electron-supply layer 12 of the electron emission device, an elemental semiconductor or a compound semiconductor of an element of a group IV, a group III-V, a group II-VI or the like, such as a germanium (Ge), germanium silicon compound (Ge—Si), silicon carbide (SiC), gallium arsenide (GaAs), indium phosphide (InP), or cadmium selenide (CdSe) or $CuInTe_2$ can be used as well.

While metals such as Al, Au, Ag and Cu are effective as the electron supplying material, Sc, Ti, V, Cr, Mn, Fe, Co, Ni, Zn, Ga, Y, Zr, Nb, Mo, Tc, Ru, Rh, Pd, Cd, Ln, Sn, Ta, W, Re, Os, Ir, Pt, Tl, Pb, La, Ce, Pr, Md, Pm, Sm, Eu, Gd, Tb, Dy, Ho, Er, Tm, Yb, Lu and the like can be used as well.

Metals Pt, Au, W, Ru and Ir are effective as the material for the thin-film metal electrode 15 on the electron emission side. In addition, Al, Sc, Ti, V, Cr, Mn, Fe, Co, Ni, Cu, Zn, Ga, Y, Zr, Nb, Mo, Tc, Rh, Pd, Ag, Cd, Ln, Sn, Ta, Re, Os, Tl, Pb, La, Ce, Pr, Nd, Pm, Sm, Eu, Gd, Tb, Dy, Ho, Er, Tm, Yb, Lu and the like can be used as well for the thin-film metal electrode.

Although sputtering is particularly effective in the fabrication of those layers and the substrate, vacuum deposition, CVD (Chemical Vapor Deposition), laser ablation, MBE (Molecular Beam Epitaxy) and ion beam sputtering are also effective.

Electron emission devices according to the invention comprising electron-supply layers each having a silicide layer were fabricated as first embodiments and their characteristics were examined concretely.

Figure 2:
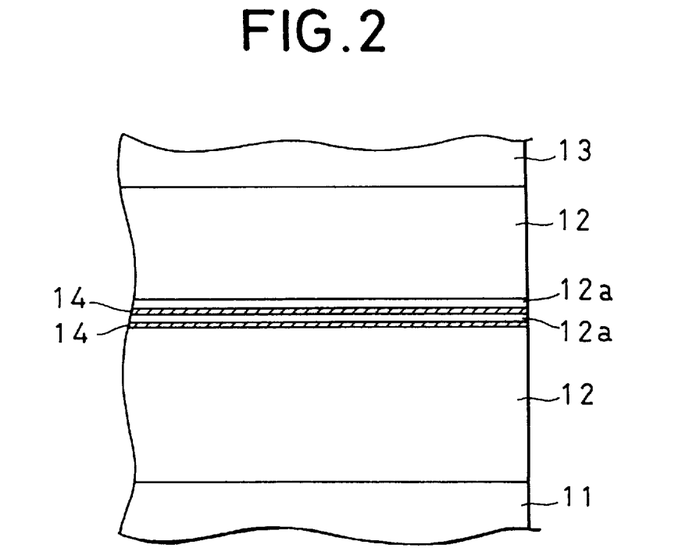
FIG. 2 is a partially enlarged cross-sectional view showing an electron emission device of an embodiment according to the invention showing an adjacent region of the silicide layer.

First, as shown in FIG. 2, an electron-supply layer 12 of 2.5 μm thick Si was deposited by sputtering, on an electrode surface 11 of each device substrate of glass on which an ohmic electrode 11 of 300 nm thick W was previously deposited by sputtering. A plurality of preliminary substrates of this type were similarly prepared.

Next a W/Si silicide layer 14 ranging from $W_{0.35}Si_{0.65}$ to $WSi_2$ was deposited with thick of 3 nm on each Si electron-supply layer 12 and then a 6 nm thick Si layer 12a was deposited on this W/Si silicide layer 14 per one preliminary substrate. A set lamination of the silicide layer 14 and the Si layer 12a is referred as {$W_{0.35}Si_{0.65}$(3 nm)/Si(6 nm)} implying {silicide (thickness) silicon(thickness)} hereinafter.

Then {$W_{0.35}Si_{0.65}$(3 nm)/Si(6 nm)} were deposited again on the Si layer 12a. The two sets of lamination of {$W_{0.35}Si_{0.65}$(3 nm)/Si(6 nm)} of the silicide layer 14 and the Si layer 12*a* are referred as {W$_{0.35}$Si$_{0.65}$(3 nm)/Si(6 nm)}$_2$ implying (silicide (thickness)/silicon(thickness))} the set number subscribed hereinafter.

After that, an electron-supply layer 12 of 2.5 μm thick Si was deposited again on the Si layer 12*a*. Subsequently, an insulator layer 13 of 400 nm thick SiO$_x$ was deposited on the electron-supply layer per one of the preliminary substrates. In this way, the first embodiments of the devices were manufactured in which a multilayer of silicide 14 was sandwiched by the two equivalent thickness electron-supply layers 12. In addition, the comparative electron emission devices were prepared in the same manner as the first embodiments excepting that an electron-supply layer 12 with thick of 5 μm was deposited without any multilayer of silicide per one of the comparative devices. Thus a plurality of second preliminary substrates were provided. Each layer was deposited by sputtering by using a gas of Ar, Kr or Xe or a mixture thereof, or a gas mixture essentially consisting of one of those rare gases with O$_2$, N$_2$ or the like mixed therein, under the sputtering conditions of a gas pressure of 0.1 to 100 mTorr, preferably 0.1 to 20 mTorr and the depositing rate of 0.1 to 1000 nm/min, preferably 0.5 to 100 nm/min.

Finally, a thin-film metal electrode of Pt was deposited with thick of 10 nm on the surface of the amorphous SiO$_x$ layer of each substrate by sputtering, thus providing plural device substrates.

Meanwhile, transparent substrates were prepared, each of which has an ITO collector electrode formed inside a transparent glass substrate and has a fluorescent layer of a fluorescent substance corresponding to R, G or B color emission formed on the collector electrode by the normal scheme.

Electron emission devices of the first embodiments were assembled in each of which the device substrate and the transparent substrate are supported apart from one another by 10 mm in parallel by a spacer in such a way that the thin-film metal electrode 15 faced the collector electrode 2, with the clearance therebetween made to a vacuum of $10^{-7}$ Torr or $10^{-5}$ Pa.

Next, the resultant electron emission devices were heated or baked at temperatures of 25° C., 100° C., 200° C., 300° C., 400° C., 500° C., 600° C., 700° C., 800° C., 900° C., and 1000° C. in a vacuum atmosphere for one hour respectively.

Then, the diode current Id and the emission current Ie of the heated and cooled plural devices corresponding to the baked temperatures were measured while an applied voltage Vd of 0 to 200 V was applied to the prepared electron emission devices. The results are shown in FIGS. 3 and 4.

Figure 3:
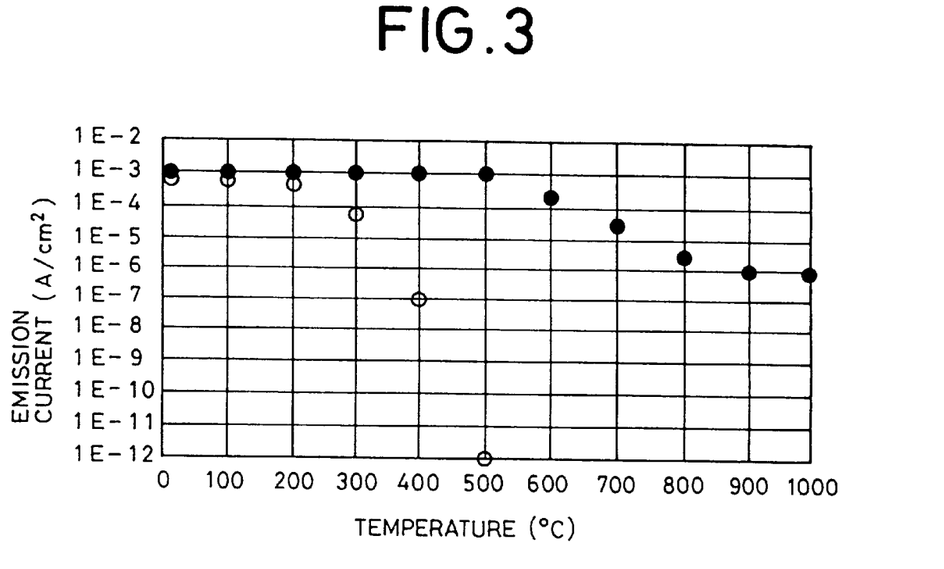
FIG. 3 is a graph showing a relationship between the emission current of the electron emission device with the layer $\{W_{0.35}Si_{0.65}(3\ nm)/Si(6\ nm)\}_2$, and the temperatures at which the devices are baked or heated in the process for manufacturing the electron emission display device according to the invention.
Figure 4:
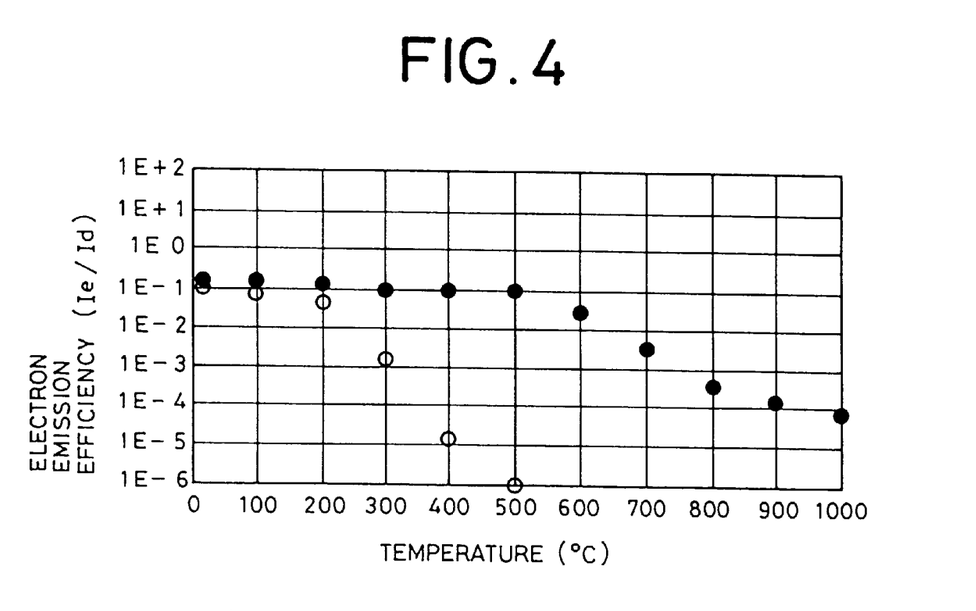
FIG. 4 is a graph showing a relationship between the electron emission efficiency of the electron emission device and the temperatures at which the devices are baked or heated in the process for manufacturing the electron emission display device according to the invention.

FIGS. 3 and 4 show the variations of the emission current Ie and the maximum electron emission efficiency (Ie/Id) respectively with respect to the temperatures at which the devices were baked or heated in the manufacturing process. In FIGS. 3 and 4, plots of ● represent the emission current values and the electron emission efficiencies of the first embodiment devices having {W$_{0.35}$Si$_{0.65}$(3 nm)/Si(6 nm)}$_2$. The reductions of emission current and emission efficiency of the first embodiment devices are smaller than those the comparative devices represented by plots of ○. In the comparative devices, the emission current and emission efficiency thereof rapidly decrease as the baked temperature rises. The first embodiment devices keep the electron emission efficiency of $1 \times 10^{-6}$ or more even after the heating treatment of the 25° C. to 1000° C. temperature.

Next, the second embodiments of electron emission devices each having a {W$_{0.35}$Si$_{0.65}$(3 nm)/Si(6 nm)}$_2$ were deposited in the same manner as the first embodiments excepting that an insulator layer 13 of SiO$_x$ was deposited while changing the film thickness thereof in a range from 50 nm to 1000 nm.

Then, the electron emission devices of the second embodiments were heated or baked at temperatures of 500° C. in a vacuum atmosphere for one hour respectively. Several devices was remained as comparative devices without heated.

After that, the diode current Id and the emission current Ie in the heated and cooled plural devices were measured correspondingly to the thicknesses of insulator layer, when a driving voltage Vd of 0 to 200 V was applied to the prepared electron emission devices. The results are shown in FIGS. 5 and 6.

Figure 5:
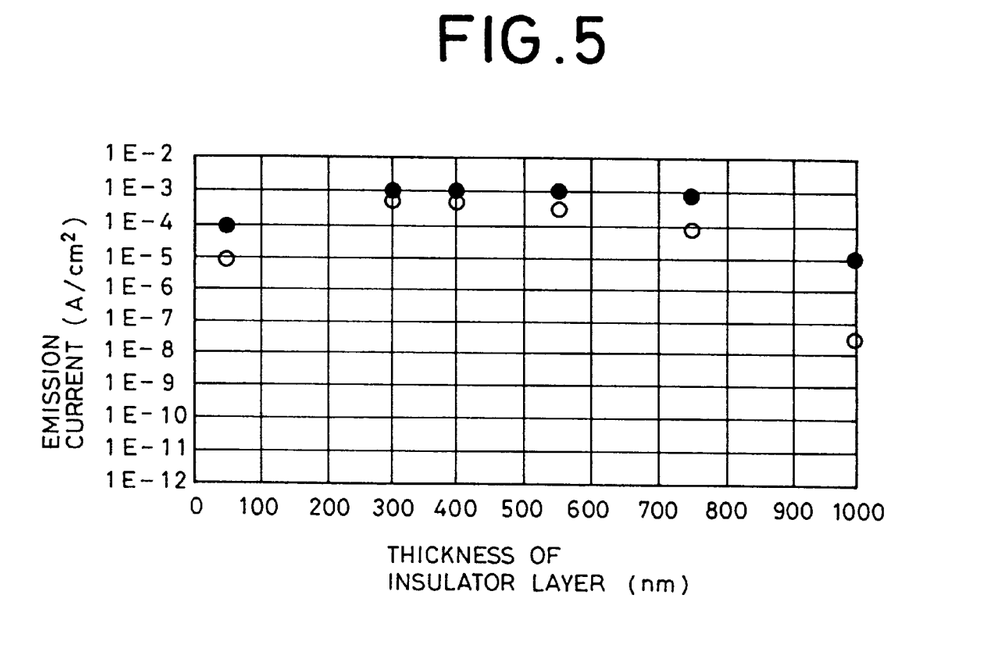
FIG. 5 is a graph illustrating a dependency of the emission current on the film thickness of an insulator layer in an electron emission device embodying the invention.
Figure 6:
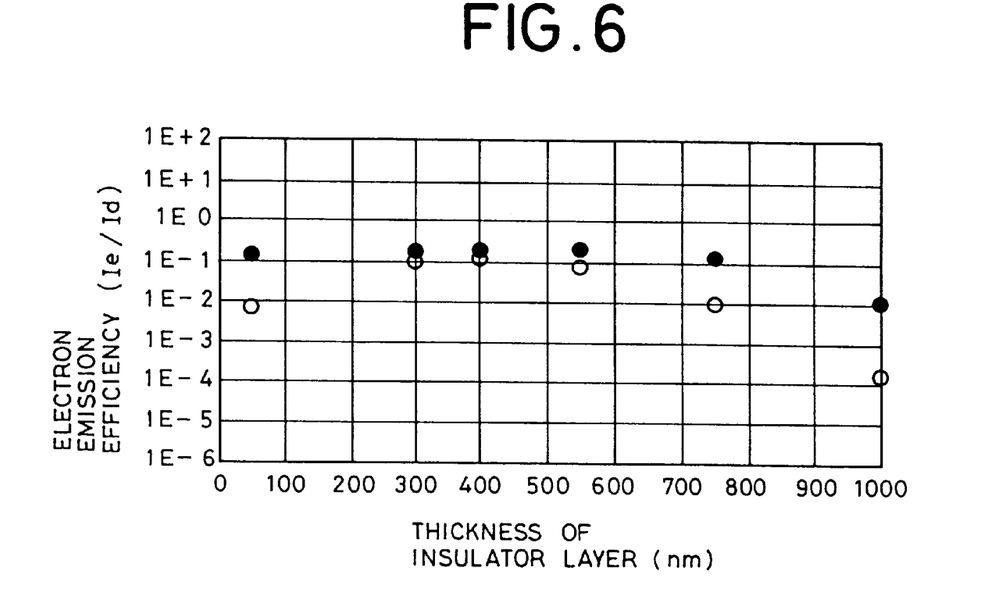
FIG. 6 is a graph showing a dependency of the electron emission efficiency on the film thickness of the insulator layer in the electron emission device embodying the invention.

FIGS. 5 and 6 show the variations of the maximum emission current Ie and the maximum electron emission efficiency (Ie/Id) respectively with respect to the film thickness of the insulator layer of the devices. As apparent from Figures, the variations of the emission current Ie and the electron emission efficiency (Ie/Id) of the devices with a {W$_{0.35}$Si$_{0.65}$(3 nm)/Si(6 nm)}$_2$ have a similar electrical properties to those of the comparative devices as far as the devices each comprising the insulator layer having thickness of 300 nm, 400 nm, and 550 nm respectively, even after the heating treatment of the 500° C. temperature. Particularly, there is little variation in the electron emission efficiency in both kinds devices. It is understood from those results that by applying a voltage of 200 V or lower, the emission current of $1 \times 10^{-6}$ A/cm$^2$ or greater can be acquired from an electron emission device which has a insulator layer with a 50 nm thickness or greater, preferably 50 to 1000 nm in thickness.

Figure 7:
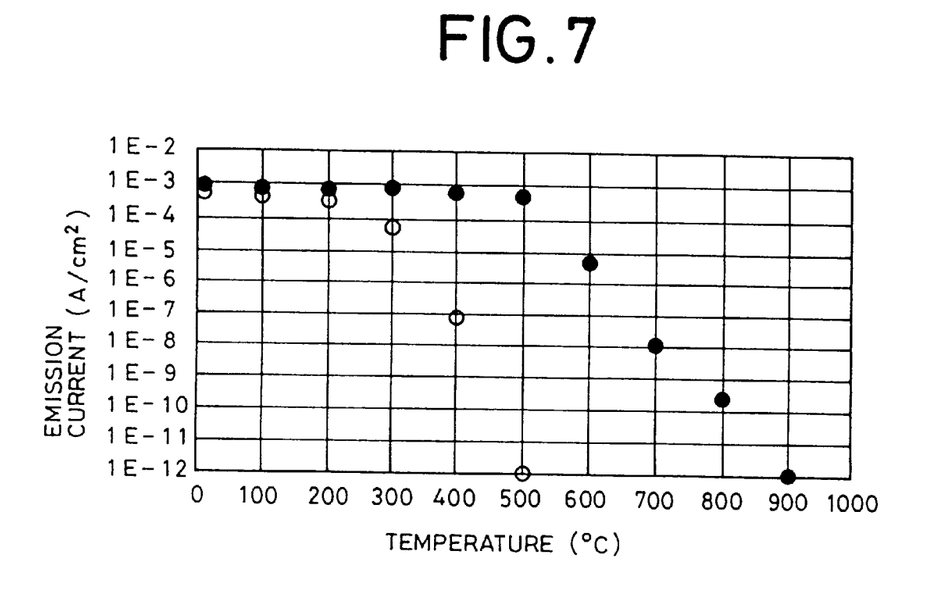
FIG. 7 is a graph showing a relationship between the emission current of the electron emission device with the layer $\{W(3\ nm)/Si(5\ nm)\}_2$, and the temperatures at which the devices are baked or heated in the process for manufacturing the electron emission display device according to the invention.
Figure 8:
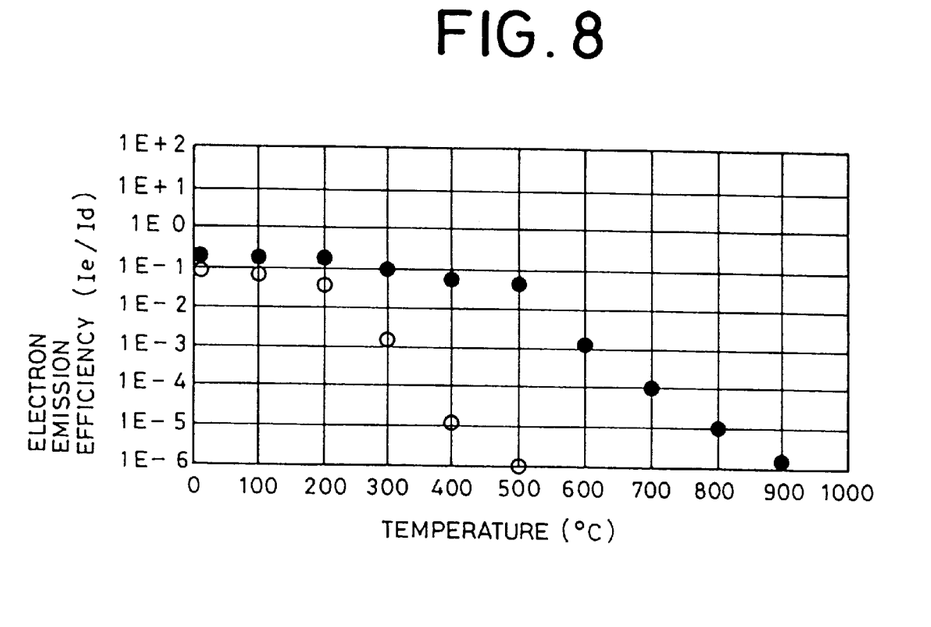
FIG. 8 is a graph showing a relationship between the electron emission efficiency of the electron emission device and the temperatures at which the devices are baked or heated in the process for manufacturing the electron emission display device according to the invention.

Next, the third embodiments of electron emission devices each having a {W(3 nm)/Si(5 nm)}$_2$ were fabricated in the same manner as the first embodiments excepting that, instead of a W$_{0.35}$Si$_{0.65}$ silicide layer 14, a tungsten metal layer 14B was formed for an artificial lattice as a whole.

Then, the electron emission devices of the third embodiments were heated or baked at the same temperature range as the first embodiments in a vacuum atmosphere for one hour respectively.

After that, the diode current Id and the emission current Ie of the heated and cooled plural devices were measured correspondingly to the heating temperatures, when a driving voltage Vd of 0 to 200 V was applied to the prepared electron emission devices. The results are shown in FIGS. 7 and 8 illustrating the variations of the emission current Ie and the maximum electron emission efficiency (Ie/Id) respectively with respect to the temperatures at which the devices were baked or heated in the manufacturing process. As seen from Figures, the reductions of emission current and emission efficiency plotted by ● of the third embodiment devices with {W(3 nm)/Si(5 nm)}$_2$ are smaller than those the comparative devices represented by plots of ○. The third embodiment devices keep the electron emission efficiency values of $1 \times 10^{-6}$ or more even after the heating treatment of the 25° C. to 1000° C. temperature.

Figure 9:
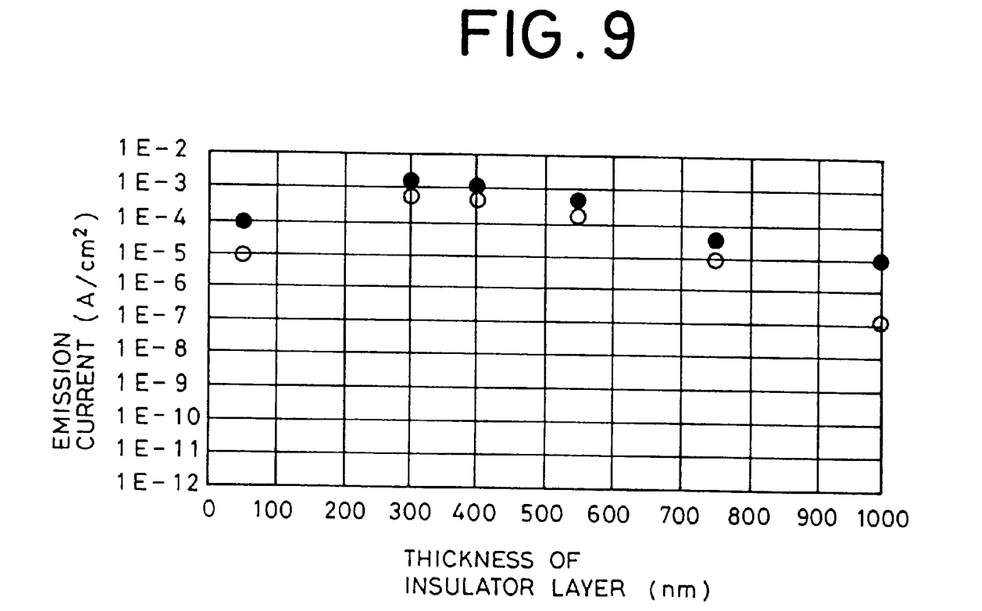
FIG. 9 is a graph illustrating a dependency of the emission current on the film thickness of an insulator layer in an electron emission device embodying the invention.
Figure 10:
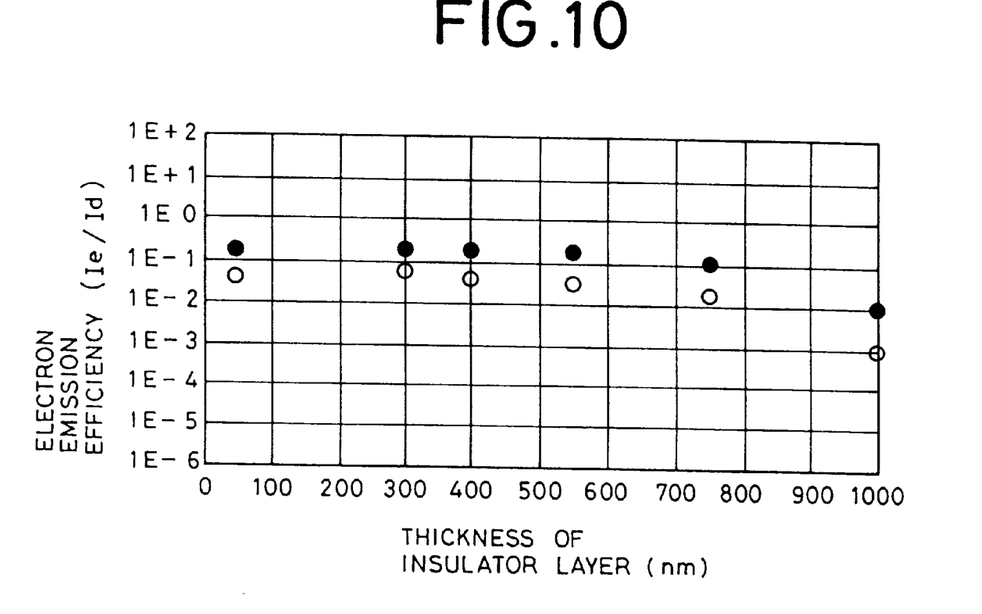
FIG. 10 is a graph showing a dependency of the electron emission efficiency on the film thickness of the insulator layer in the electron emission device embodying the invention.

Furthermore, the fourth embodiments of electron emission devices each having a {W(3 nm)/Si(5 nm)}$_2$ were formed in the same manner as the first embodiments excepting that, a tungsten metal layer 14B was formed for an artificial lattice as a whole instead of a W$_{0.35}$Si$_{0.65}$ silicide layer 14 and that an insulator layer 13 of SiO$_x$ was deposited while changing the film thickness thereof in a range from 50 nm to 1000 nm.

Then, the electron emission devices of the fourth embodiments were heated or baked at temperatures of 500° C. in a vacuum atmosphere for one hour respectively. Several devices was remained as comparative devices without heated.

After that, the diode current Id and the emission current Ie of the heated and cooled plural devices were measured correspondingly to the thicknesses of insulator layer, when a driving voltage Vd of 0 to 200 V was applied to the prepared electron emission devices. The results are shown in FIGS. 9 and 10.

FIGS. 9 and 10 show the variations of the maximum emission current Ie and the maximum electron emission efficiency (Ie/Id) respectively with respect to the film thickness of the insulator layer of the devices. As apparent from Figures, the variations of the emission current Ie and the electron emission efficiency (Ie/Id) of the devices having a $\{W(3\ nm)/Si(5\ nm)\}_2$ have a similar electrical properties to those of the comparative devices as far as the devices each comprising the insulator layer having thickness of 300 nm, 400 nm, and 550 nm respectively, even after the heating treatment of the 500° C. temperature. Particularly, there is little variation in the electron emission efficiency in both kinds devices. It is understood from those results that by applying a voltage of 200 V or lower, the electron emission efficiency of $1 \times 10^{-3}$ or greater can be acquired from an electron emission device which has a insulator layer with a 50 nm thickness or greater, preferably 50 to 1000 nm in thickness.

As results from various experiments of such devices in which a multilayer composed of an artificial lattice layer with range $\{W_{0.35}Si_{0.65}(2-4\ nm)/Si(1-6\ nm)\}_{2-3}$ was deposited between the W ohmic electrode and the Si electron-supply layer per each device by sputtering, there is little variation in the electric properties, particularly, electron emission efficiency in both kind of devices before and after the heating treatment, sven after the heating treatment of the 500° C. temperature. Typically, in the silicide layer, each $WSi_2$ layer have a thickness of 2.5 nm and each Si layer have a thickness of 5.5 nm and the total thickness is 12 to 15 nm, In view of the crystalline structure, the multi {WSi/Si} layers of artificial lattice before heating in the first and second embodiments were in an amorphous structure, and after heated, the amorphous structures of the layer were kept. However. although the multi layers {WSi/Si} of artificial lattice before heated in the third and fourth embodiments were in an amorphous structure, after heated at 500° C., the crystal structure of the layer was changed from the amorphous structure to the bcc structure of W. In case of the W-Si diode structure of the layer, the barrier height of the interface is constant and the tungsten silicide of WSi is formed.

Moreover, other comparative devices having multi-layers {Mo(2–8 nm)/Si(1.5–7 nm)} which are referred as the device A and $\{MoSi_2(2-8\ nm)/Si(1.5-7\ nm)\}$ which are referred as the device B were manufactured in the same manner as the above embodiments excepting that molybdenum (Mo) was used for the device instead of tungsten (W). Although, after the heating treatment of 300° C. for 30 minutes, the diffusion occurred within the {Mo/Si} layer in the device A, there was not observed any diffusion within the $\{MoSi_2/Si\}$ layer in the device B.

It is understood that the good results are obtained from the device comprising the electron-supply layer having silicide layer and the insulator layer with a 50 nm thickness or greater.

With a voltage of approximately 4 kV applied between the fluorescent-substance coated collector electrode and the thin-film metal electrode of one embodiment of the above devices whose insulator layers have thicknesses of 50 nm or greater, a uniform fluorescent pattern corresponding to the shape of the thin-film metal electrode was observed. This indicates that the electron emission from the amorphous $SiO_x$ layer is uniform and has a high linear movement, and that those devices can serve as an electron emission diode, or a light-emitting diode or a laser diode which emits electromagnetic waves with millimeter or sub-millimeter wavelength and also a high speed switching device.

By a scanning electron microscope (SEM), there were observations of the surface of the $SiO_x$ insulator layer resulted from the sputtering during the above deposition process, microstructures composed of grain surface each having about 20 nm diameter appeared. The microstructures composed of grain structure of $SiO_x$ of the insulator layer seems to cause the peculiar phenomena that the tunnel current flows through the insulator layer which has a thickness of 50 nm or greater. While $SiO_x$ is an insulator by nature, multiple bands with low potentials are caused by the occurrence of defects adjacent thereto or impurities in the forbidden band of the insulator layer. It is assumed that electrons tunnel-pass through multiple bands with the low-potential one after another, and thus pass through the insulator layer of 50 nm or greater in thickness as a consequence.

Figure 11:
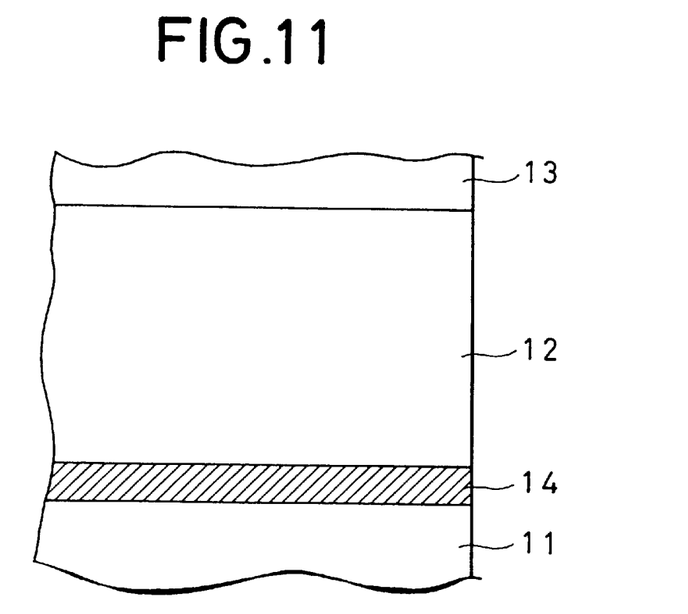
FIGS. 11 to 15 are partially enlarged cross-sectional views each showing an electron emission device of another embodiment according to the invention showing an adjacent region of the silicide layer.
Figure 12:
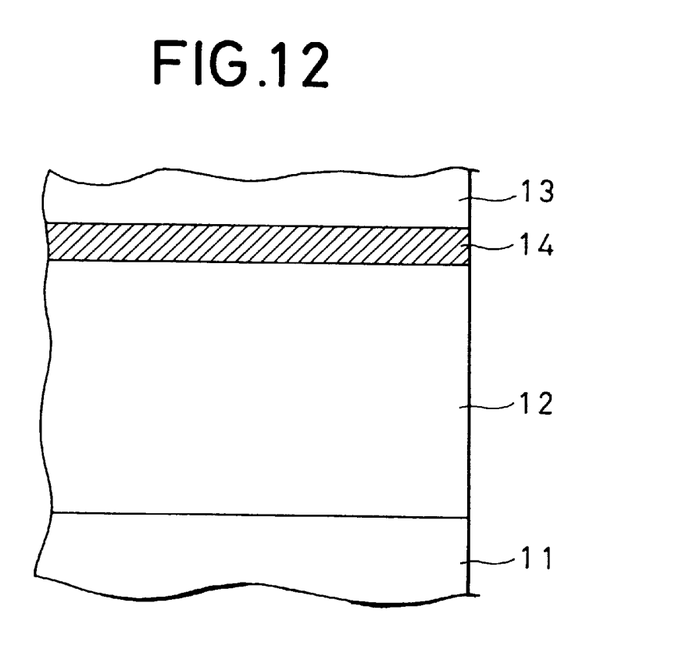

In addition that two of the silicide layers are disposed at an mediate region of the electron-supply layer as shown in the above embodiments, as shown in FIG. 11, a single or plural silicide layers 14 may be disposed at an interface between the ohmic electrode 11 and the electron-supply layer 12. As shown in FIG. 12, a single or plural silicide layers 14 may be disposed at an interface between the insulator layer 13 and the electron-supply layer 12.

Figure 13:
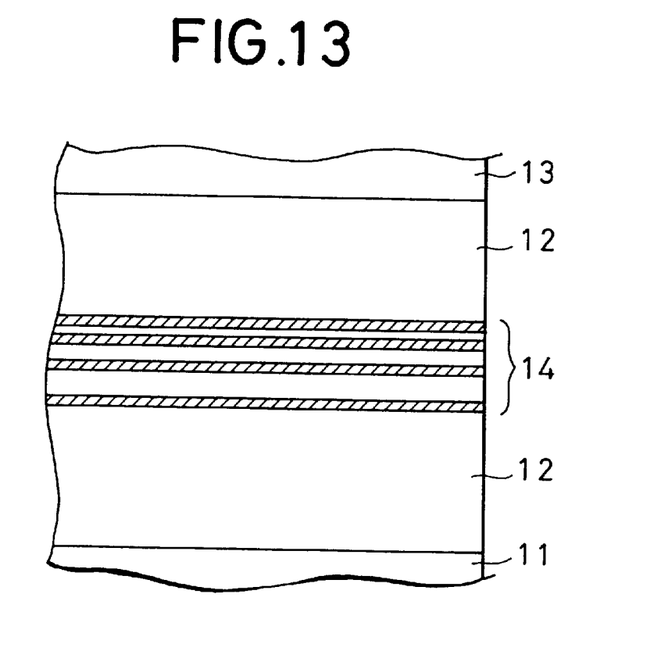

Further, as shown in FIG. 13 illustrating a partially enlarged cross section view of the device, two or more of the silicide layers 14 may be disposed within the electron-supply layer 12 to be divided into three portions as a multi-layered structure. In other words, a plurality of the silicide layer and the electron-supply layer are alternately layered by in the thickness direction of the device. In addition, a plurality of layered silicide layers 14 may be formed so as to have their interval gradually descended (or ascended) in the thickness direction upward.

Figure 14:
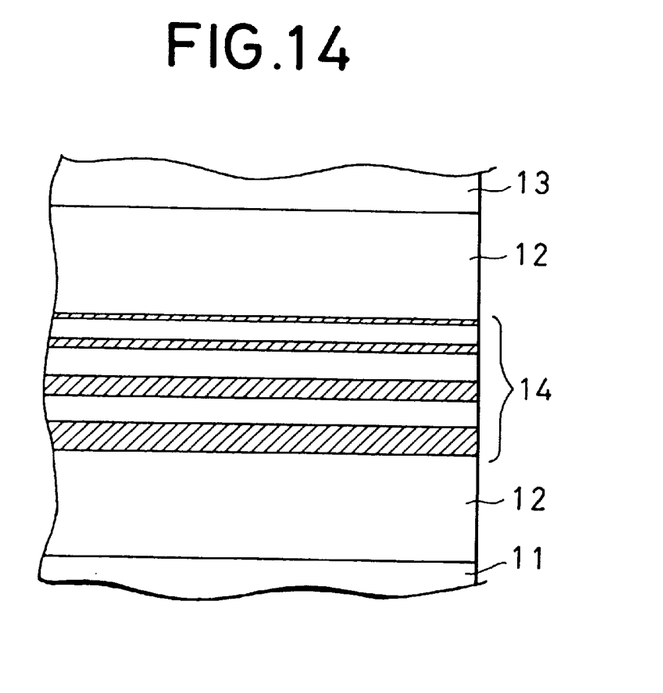

As shown in FIG. 14, a plurality of layered silicide layers 14 may be formed within the electron-supply layer 12 so as to have their thicknesses gradually descended (or ascended) in the thickness direction upward.

Figure 15:
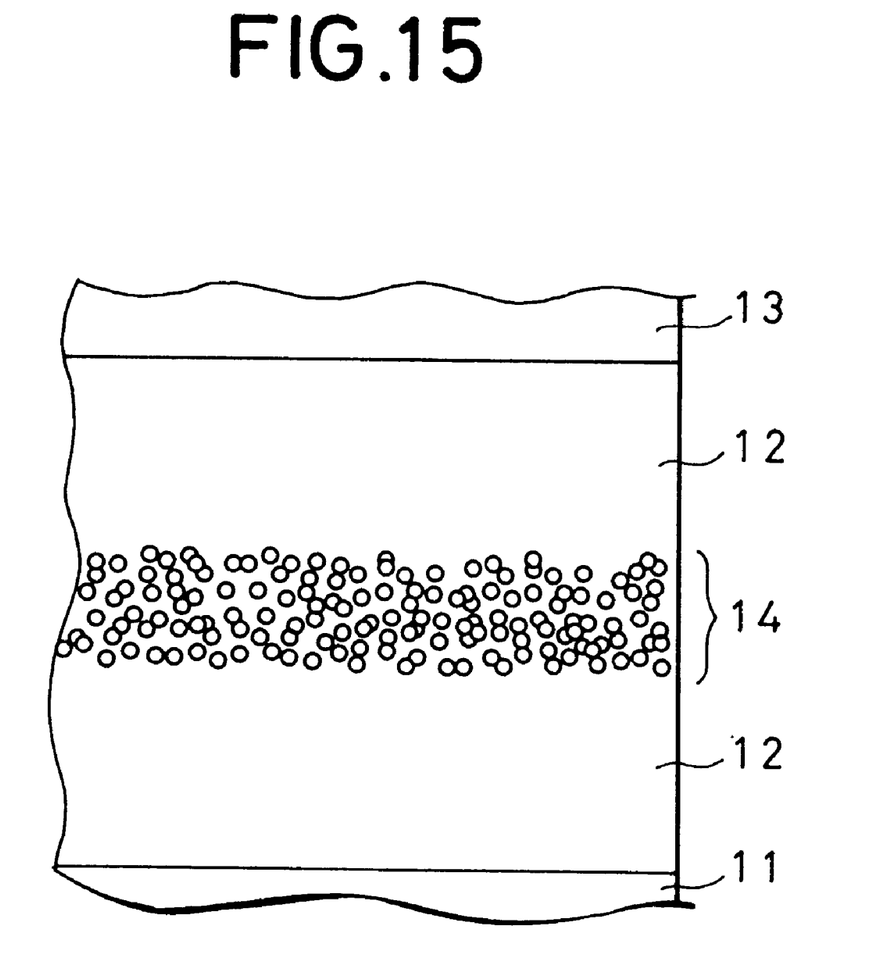

Furthermore, other embodiments are shown in FIG. 15 the silicide layer 14 may be formed, by sputtering, within the electron-supply layer 12 so as to be a dispersion region of dopants of a high conductive material, This silicide region also can serve to facilitate to promote the transport of electrons from the ohmic electrode 11 to the electron-supply layer 12. In addition, the silicide region 14 may be formed to have a incline density of dopants so that as the higher or lower density of silicide dopants is provided as the silicide region 14 is closer to the thin-film metal electrode 15.

It is understood from those results that the electron-supply layer having silicide layer is effective for the electron emission device capable of driving in a stable emission current with a low applied voltage comprising; the electron-supply layer made of metal or semiconductor; the insulator layer with a 50 nm thickness or greater; and the thin-film metal electrode facing a vacuum space, so that the electron emission device emits stably electrons when applying a relatively low voltage across the electron-supply layer and the thin-film metal electrode.

Figure 16:
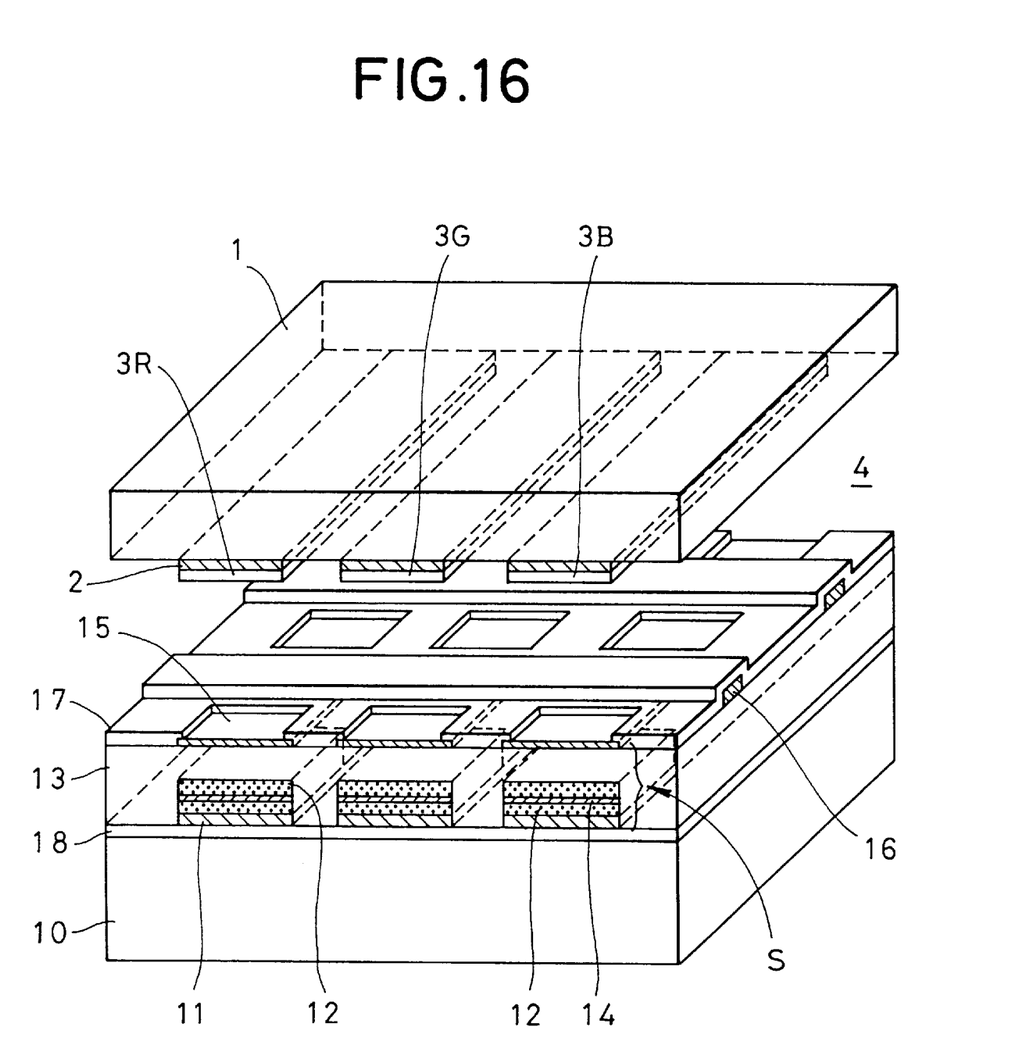
FIG. 16 is a schematic perspective view showing an electron emission display device according to one embodiment of the invention.

FIG. 16 shows an electron emission display device according to one embodiment of the invention. This embodiment comprises a pair of the transparent substrate 1 and the device substrate 10, which face each other with a vacuum space 4 in between. In the illustrated electron emission display apparatus, a plurality of transparent collector electrodes 2 of, for example, an indium tin oxide (so-called ITO), tin oxide (SnO), zinc oxide (ZnO) or the like, are formed in parallel on the inner surface of the transparent glass substrate 1 or the display surface (which faces the back substrate 10). The collector electrodes 2 may be formed integrally. The transparent collector electrodes which trap emitted electrons are arranged in groups of three in association with red (R), green (G) and blue (B) color signals in order to provide a color display panel, and voltages are applied to those three collector electrodes respectively. Therefore, fluorescent layers 3R, 3G and 3B of fluorescent substances corresponding to R, G and B color emisions are respectively formed on the three collector electrodes 2 in such a way as to face the vacuum space 4.

A plurality of ohmic electrodes 11 are formed in parallel on the inner surface of the device substrate 10 of glass or the like which faces the transparent glass substrate 1 with the vacuum space 4 in between (i.e., said inner surface faces the transparent glass substrate 1) via an auxiliary insulator layer 18. The auxiliary insulator layer 18 is comprised of an insulator such as $SiO_2$, $SiN_x$, $Al_2O_3$ or AlN, and serves to prevent an adverse influence of the device substrate 10 on the device (such as elution of an impurity such as an alkaline component or a roughened substrate surface). A plurality of electron emission devices S are formed on the ohmic electrodes 11. In order that adjoining thin-film metal electrodes 15 are electrically connected to each other, a plurality of bus electrodes 16 are formed on parts of the thin-film metal electrodes 15, extending in parallel to one another and perpendicular to the ohmic electrodes 11. Each electron emission device S comprises the electron-supply layer 12 having the silicide layer 14, the insulator layer 13 and the thin-film metal electrode 15 which are formed in order on the associated ohmic electrode 11. The thin-film metal electrodes 15 face the vacuum space 4. A second auxiliary insulator layer 17 with openings is formed to separate the surfaces of the thin-film metal electrodes 15 into a plurality of electron emission regions. This second auxiliary insulator layer 17 covers the bus electrodes 16 to prevent unnecessary short-circuiting.

The material for the ohmic electrodes 11 is Au, Pt, Al, W or the like which is generally used for the wires of an IC, and has a uniform thickness for supplying substantially the same current to the individual devices.

From the principle of electron emission, it is better that the material for the thin-film metal electrode 15 has a lower work function ø and is thinner. To increase the electron emission efficiency, the material for the thin-film metal electrode 15 should be a metal of the group I or group II in the periodic table; for example, Mg, Ba, Ca, Cs, Rb, Li, Sr, and the like are effective and alloys of those elements may be used as well. To make the thin-film metal electrode 15 very thin, the material for the thin-film metal electrode 15 should be chemically stable with a high conductivity; for example, single substances of Au, Pt, Lu, Ag and Cu or alloys thereof are desirable. It is effective to coat or dope a metal with a low work function as described above on or in those metals.

The material for the bus electrodes 16 can be Au, Pt, Al or the like which is generally used for the wiring of an integrated circuit IC, and should have a thickness enough to supply substantially the same potential to the individual devices, adequately of 0.1 to 50 μm. A simple matrix system or an active matrix system may be employed as the driving system for the display device of the invention.

What is claimed is:

1. An electron emission device, comprising:

an electron-supply layer made of metal or semiconductor;

an insulator layer formed on said electron-supply layer; and a thin-film metal electrode formed on the insulator layer and facing a vacuum space, wherein said insulator layer has a film thickness of 50 nm or greater, and wherein said electron-supply layer has a silicide layer, said electron emission device emitting electrons when an electric field is applied between said electron-supply layer and said thin-film metal.

2. The electron emission device according to claim 1, wherein said electron-supply layer is disposed on an ohmic electrode and said silicide layer is disposed at an interface between said ohmic electrode and said electron-supply layer.

3. The electron emission device according to claim 1, wherein said silicide layer is disposed at an interface between said insulator layer and said electron-supply layer.

4. The electron emission device according to claim 1, wherein said silicide layer is disposed at an mediate region of said electron-supply layer.

5. The electron emission device according to claim 1, wherein a plurality of said silicide layer and said electron-supply layer are alternately layered by in the thickness direction.

6. The electron emission device according to claim 5, wherein a plurality of said layered silicide layers have thicknesses gradually descended in the thickness direction.

7. The electron emission device according to claim 5, wherein a plurality of said layered silicide layers have thicknesses gradually ascended in the thickness direction.

8. The electron emission device according to claim 1, wherein said insulator layer is contiguously layered on said electron-supply layer, wherein said electrode is contiguously layered on said electron supply layer.

9. The electron emission device according to claim 1, wherein said silicide layer is contiguously layered between two adjacent silicon dioxide layers.

10. The electron emission device according to claim 1, wherein the electrons are emitted through said insulator layer and said thin-film metal.

11. The electron emission display device, comprising:

a pair of first and second substrates facing each other with a vacuum space in between;

a plurality of electron emission devices provided on said first substrate;

a collector electrode provided in said second substrate; and a fluorescent layer formed on said collector electrode, wherein each of said electron emission devices includes an electron-supply layer of metal or semiconductor, an insulator layer formed on said electron-supply layer, and a thin-film metal electrode formed on said insulator layer and facing the vacuum space, wherein said insulator layer has a film thickness of 50 nm or greater, and wherein said electron-supply layer has a silicide layer.

12. The electron emission display device according to claim 11, wherein said electron-supply layer is disposed on an ohmic electrode and said silicide layer is disposed at an interface between said ohmic electrode and said electron-supply layer.

13. The electron emission display device according to claim 11, wherein said silicide layer is disposed at an interface between the insulator layer and said electron-supply layer.

14. The electron emission display device according to claim 11, wherein said silicide layer is disposed at an mediate region of said electron-supply layer.

15. The electron emission display device according to claim 11, wherein a plurality of said silicide layer and said electron-supply layer are alternately layered by in the thickness direction.

16. The electron emission display device according to claim 15, wherein a plurality of said layered silicide layers have thicknesses gradually descended in the thickness direction.

17. The electron emission display device according to claim 15, wherein a plurality of said layered silicide layers have thicknesses gradually ascended in the thickness direction.

18. The electron emission display device according to claim 11, wherein said insulator layer is contiguously layered on said electron-supply layer, wherein said electrode is contiguously layered on said electron supply layer.

19. The electron emission display device according to claim 11, wherein said silicide layer is contiguously layered between two adjacent silicon dioxide layers.

20. The electron emission display device according to claim 11, wherein the electrons are emitted through said insulator layer and through said thin-film metal.

* * * * *